United States Patent
Glensvig et al.

(10) Patent No.: US 10,024,159 B2
(45) Date of Patent: Jul. 17, 2018

(54) METHOD FOR DETECTING A LEAKING POINT IN A HEAT RECOVERY SYSTEM

(71) Applicants: AVL LIST GMBH, Graz (AT); FPT INDUSTRIAL S.P.A., Turin (IT); IVECO S.P.A., Turin (IT)

(72) Inventors: Michael Glensvig, Graz (AT); Markus Thaler, Graz (AT); Susanne Mahler, Gratkorn (AT)

(73) Assignees: AVL List GmbH, Graz (AT); FPT Industrial S.P.A., Turin (IT); Iveco S.P.A., Turin (IT)

( * ) Notice: Subject to any disclaimer, the term of this patent is extended or adjusted under 35 U.S.C. 154(b) by 0 days.

(21) Appl. No.: 15/652,997

(22) Filed: Jul. 18, 2017

(65) Prior Publication Data

US 2018/0016901 A1   Jan. 18, 2018

(51) Int. Cl.
   *F01B 25/26*   (2006.01)
   *F01K 23/10*   (2006.01)
   (Continued)

(52) U.S. Cl.
   CPC ............ *F01B 25/26* (2013.01); *F01K 23/065* (2013.01); *F01K 23/101* (2013.01);
   (Continued)

(58) Field of Classification Search
   CPC ...... F01B 25/26; F01K 23/101; F22B 1/1807; G08B 21/187; Y02T 10/47; Y02T 10/24;
   (Continued)

(56) References Cited

U.S. PATENT DOCUMENTS 6,526,358 B1   2/2003   Mathews et al.
8,783,029 B2 * 7/2014   Vigild ................. F02B 29/0475
                                                         123/563

(Continued)

FOREIGN PATENT DOCUMENTS

DE   102012221153   6/2014
JP   2010156314     7/2010
WO   2016087096     6/2016

OTHER PUBLICATIONS

English Abstract of JP 2010156314.
English Abstract of DE 102012221153.

*Primary Examiner* — Mohamed Barakat
(74) *Attorney, Agent, or Firm* — Dykema Gossett PLLC

(57) ABSTRACT

A method for detecting a leaking point in a heat recovery system of an internal combustion engine of a motor vehicle, wherein the heat recovery system includes a combustible working medium and a working medium circuit with an evaporator, a pump and an expansion machine. The recirculated exhaust gas of the engine flows through or around the evaporator which is arranged in an exhaust-gas return line. At least one oxidation catalytic converter is arranged in an exhaust gas line of the engine. A first temperature sensor is arranged in the exhaust gas line upstream and a second exhaust gas temperature sensor is arranged downstream of the oxidation catalytic converter. Temperatures of the exhaust gas are measured with these temperature sensors during operation of the engine in the exhaust gas line upstream and downstream of the oxidation catalytic converter. A temperature difference of the exhaust gas upstream and downstream of the oxidation catalyst is determined, wherein upon occurrence of an abnormally high temperature difference a conclusion is drawn on a leak in the evaporator.

14 Claims, 3 Drawing Sheets

(51) Int. Cl.
*F22B 1/18* (2006.01)
*F01K 23/06* (2006.01)
*G08B 21/18* (2006.01)

(52) U.S. Cl.
CPC ........ *F22B 1/1807* (2013.01); *F01N 2550/00* (2013.01); *G08B 21/187* (2013.01); *Y02T 10/166* (2013.01)

(58) Field of Classification Search
CPC .... F01N 3/2066; F01N 2550/02; F01N 11/00; F02M 26/15
See application file for complete search history.

(56) References Cited

U.S. PATENT DOCUMENTS

| | | | |
|---|---|---|---|
| 9,458,799 B2* | 10/2016 | Balthes | F01N 3/0231 |
| 2005/0150212 A1 | 7/2005 | Pfaeffle et al. | |
| 2008/0022677 A1* | 1/2008 | Barbe | F02B 37/00 |
| | | | 60/599 |
| 2010/0146943 A1 | 6/2010 | Muramatsu et al. | |
| 2014/0050623 A1* | 2/2014 | Hagimoto | F01N 3/2066 |
| | | | 422/82.12 |
| 2014/0109554 A1* | 4/2014 | Balthes | F01N 3/023 |
| | | | 60/274 |
| 2015/0040862 A1* | 2/2015 | Bong | F02P 5/145 |
| | | | 123/406.3 |

* cited by examiner

METHOD FOR DETECTING A LEAKING POINT IN A HEAT RECOVERY SYSTEM

BACKGROUND OF THE INVENTION

Field of the Invention

The invention relates to a method for detecting a leaking point in a heat recovery system of an internal combustion engine of a motor vehicle, wherein the heat recovery system includes at least one particularly combustible working medium and a working medium circuit with at least one evaporator, a pump and at least one expansion machine, wherein recirculated exhaust gas of the internal combustion engine flows through or around the evaporator which is arranged in an exhaust-gas return line, and wherein at least one oxidation catalytic converter Is arranged in an exhaust gas line of the internal combustion engine. Furthermore, the invention relates to an internal combustion engine, having a heat recovery system which has at least one particularly combustible working medium and a working medium circuit with at least one EGR evaporator, a pump and at least one expansion machine, wherein the EGR evaporator is arranged in an exhaust-gas return line of the Internal combustion engine, wherein at least one oxidation catalytic converter Is arranged in at least one exhaust gas line of the Internal combustion engine, for carrying out this method.

The Prior Art

In the operation of a system for heat recovery with a combustible working medium in conjunction with an internal combustion engine and an evaporator, in particular an EGR evaporator (EGR=exhaust gas recirculation), the detection of leakages in the system is of high priority. Leakages in a heat recovery system can lead to the following critical scenarios:
  Leakage of the working medium into the environment—leads to a fire hazard when using a combustible working medium such as, for example, ethanol.
  Entry of the combustible working medium into the internal combustion engine—causes damage if, for example, the working medium enters the combustion chamber via an EGR evaporator.
  Overheating of system components due to insufficient filling level of the working medium—which can, for example, lead to overheating of the exhaust gas evaporator if the working medium mass flow is too low.
In order to establish a leak in a heat recovery system, for example, the following methods are known:
  Monitoring the filling level of the working medium in the compensating tank by means of a level sensor. If the filling level is too low, a conclusion is drawn on a leak.
  Leak test by pressurising the deactivated, cold system and then observing the pressure gradient. An excessively rapid pressure drop indicates a leak.
  Measuring the electrical conductivity of the insulation of the heat recovery system. A change in conductivity is an indication of a leak.
For example, U.S. Pat. No. 6,526,358 B1 describes a method for detecting leaks and blockages in a fluid circuit wherein pressure, temperature and flow rate are measured and placed in relation at different points in the circuit.

JP 2010-156314 A discloses a heat recovery system for an Internal combustion engine wherein $O_2$ sensors for leakage detection are arranged in the coolant circuit of the heat recovery system.

Known methods come with the disadvantage that they can be carried out either only in the deactivated state of the vehicle or the internal combustion engine and/or that devices such as additional sensors or the like are required.

It is the object of the invention to allow recognising leaks in the evaporator of a heat recovery system in an early and reliable manner in the simplest possible manner.

SUMMARY OF THE INVENTION

According to the invention, this is achieved in that at least one first temperature sensor is arranged in the exhaust gas line upstream of the oxidation catalytic converter and at least one second exhaust gas temperature sensor is arranged downstream of the oxidation catalytic converter, and the temperature of the exhaust gas is measured with these temperature sensors during operation of the internal combustion engine in the exhaust gas line upstream and downstream of the oxidation catalytic converter, and a temperature difference of the exhaust gas upstream and downstream of the oxidation catalytic converter is determined, wherein upon occurrence of at least an abnormally high temperature difference, preferably after carrying out a plausibility check, a conclusion is drawn on a leak in the evaporator.

The method can be applied to internal combustion engines with a heat recovery system in which at least one first temperature sensor is arranged upstream of the oxidation catalytic converter and a second temperature sensor is arranged downstream of the oxidation catalytic converter and with these temperature sensors the temperature of the exhaust gas in the exhaust gas line of the internal combustion engine can be measured upstream and downstream of the oxidation catalytic converter, wherein the temperature sensors are connected to an electronic control and/or evaluation unit.

Temperature sensors upstream and downstream of the oxidation catalytic converter are provided as a standard in known internal combustion engines. Thus, the method according to the invention makes do with standard motor vehicle sensor systems.

In the oxidation catalytic converter, mainly unburnt hydrocarbons ($C_mH_n$) and carbon monoxide (CO) are converted to carbon dioxide and water. During this process, energy is released of the order of the lower calorific values of carbon monoxide and hydrocarbons. The lower calorific value of CO is 10.1 MJ/kg, the lower calorific value of $C_mH_n$ is, for example, 42 MJ/kg (equivalent to diesel/lubricating oil). During the conversion of the $C_mH_n$ and the CO in the oxidation catalytic converter, the released energy is used to heat the oxidation catalytic converter and to heat the exhaust gas stream passing through the oxidation catalytic converter.

The increase in the exhaust gas temperature during the through-flow of the oxidation catalytic converter is dependent on the concentration of the hydrocarbons and the carbon monoxide at the inlet of the oxidation catalytic converter.

The invention is based on the observation that in the oxidation catalytic converter not only unburnt hydrocarbons which originate from the fuel but also hydrocarbons are converted from the working medium of the heat recovery system, e.g. ethanol, which likewise leads to a temperature increase of the exhaust gas during the flow through the oxidation catalytic converter to the extent of the lower calorific value of the working medium, which for ethanol is 28.9 MJ/kg for example.

Thus, a conclusion on a leakage of the heat recovery system can be drawn when an abnormally high temperature difference is detected between the measured values of the first temperature sensor and the second temperature sensor. Leakage is understood to mean a leak, wherein the working medium escapes in an uncontrolled manner from the evaporator. Abnormal in this context means that the determined temperature difference is higher than would be allowed by a value corresponding to the current operating point. In order to verify or falsify this, a plausibility check is advantageously carried out with regard to the determined temperature difference. The plausibility check in this case is based for example on a check whether the increased temperature difference can be owed to imperfect combustion of the injected fuel.

A stationary operating mode is an operation of the internal combustion engine at the same speed or load. A transient operating mode is an operation of the internal combustion engine with changing speed or load. Normal engine operation means an operation of the internal combustion engine in which a positive torque is provided by the internal combustion engine for driving the vehicle. A load-free operating mode is an operation of the internal combustion engine in which the internal combustion engine does not provide torque for driving the vehicle.

The leakage test can be carried out in a stationary operating mode, in a transient operating mode or in a load-free operating mode.

For carrying out a leakage test in stationary operation, a maximum stationary setpoint value for the temperature difference upstream and downstream of the oxidation catalytic converter can be defined for at least one defined stationary operating mode of the internal combustion engine, the internal combustion engine is operated in this stationary operating mode and the determined temperature difference can be compared with the defined stationary setpoint value of the defined stationary operating mode. In this case, a leakage in the EGR evaporator can be concluded if the determined temperature difference is greater than the maximum stationary setpoint value of the defined stationary operating mode.

It is advantageous in order to carry out the leakage test in transient operation if a maximum transient setpoint value for the temperature difference upstream and downstream of the oxidation catalytic converter is defined for at least one defined transient operating mode of the internal combustion engine, the internal combustion engine is operated in this transient operating mode and the determined temperature difference is compared with the defined transient setpoint value of the defined transient operating mode. A conclusion is drawn on a leakage in the EGR evaporator when the determined temperature difference is greater than the maximum transient setpoint value of the defined transient operating mode.

Furthermore, a leakage test can be carried out particularly advantageously during at least one load-free operating mode of the internal combustion engine.

Load-free operating modes are, for example, idling running, coasting operation or motor-braking operation of the vehicle or internal combustion engine.

It is particularly advantageous if a minimum value for the temporal reduction in the temperature difference upstream or downstream of the oxidation catalytic converter is defined for at least one defined, load-free operating mode of the internal combustion engine, in particular during idle running, coasting operation or motor-braking operation of the internal combustion engine, the internal combustion engine is operated in this load-free operating mode and a temporal curve of the temperature difference upstream and downstream of the oxidation catalytic converter is determined and compared with the defined minimum value for the temporal reduction in the temperature difference. A conclusion is drawn on a leakage in the EGR evaporator when the reduction in the determined temporal curve of the temperature difference is lower than the minimum value for the temporal reduction in the temperature difference upstream and downstream of the oxidation catalyst in the load-free operating mode.

The plausibility check can, for example, be carried out in normal motor operation and/or in motor-braking mode. In this case, in normal engine operation of the internal combustion engine, a) a plausibility check can be carried out upon the occurrence of an abnormally high temperature difference in that the injection quantity of fuel, preferably by means of a closed control loop, is reduced or stopped, and it is examined whether a substantial reduction in the measured temperature difference occurs after the expiration of a defined first waiting time, and b) if an abnormally high temperature difference is still detected upstream and downstream of the oxidation catalytic converter, a conclusion is drawn on a leakage in the evaporator. Alternatively or additionally, the injection of the fuel can be reduced or stopped for carrying out the plausibility check in the motor-braking mode of the internal combustion engine, and can be examined whether a substantial reduction in the measured temperature difference occurs after expiration of a defined second waiting time, and if an abnormally high temperature difference is still detected upstream and downstream of the oxidation catalytic converter, a conclusion is drawn on a leakage in the EGR evaporator.

The first and/or second waiting time should be, for example, at least 30 to 60 seconds, so that a reaction equilibrium state can be established.

An abnormally high temperature difference is present, for example, when the difference of the measured temperature is greater than 10°±20° upstream and downstream of the oxidation catalytic converter.

If a leakage of the evaporator is undoubtedly detected, a corresponding warning signal can be output to the driver and/or a corresponding entry in the error code can be entered in the on-board diagnostic system.

BRIEF DESCRIPTION OF THE DRAWINGS

The Invention will be explained in greater detail below with reference to a non-limiting exemplary embodiment shown in the drawings, wherein.

DETAILED DESCRIPTION OF THE DRAWINGS

Figure 1A:
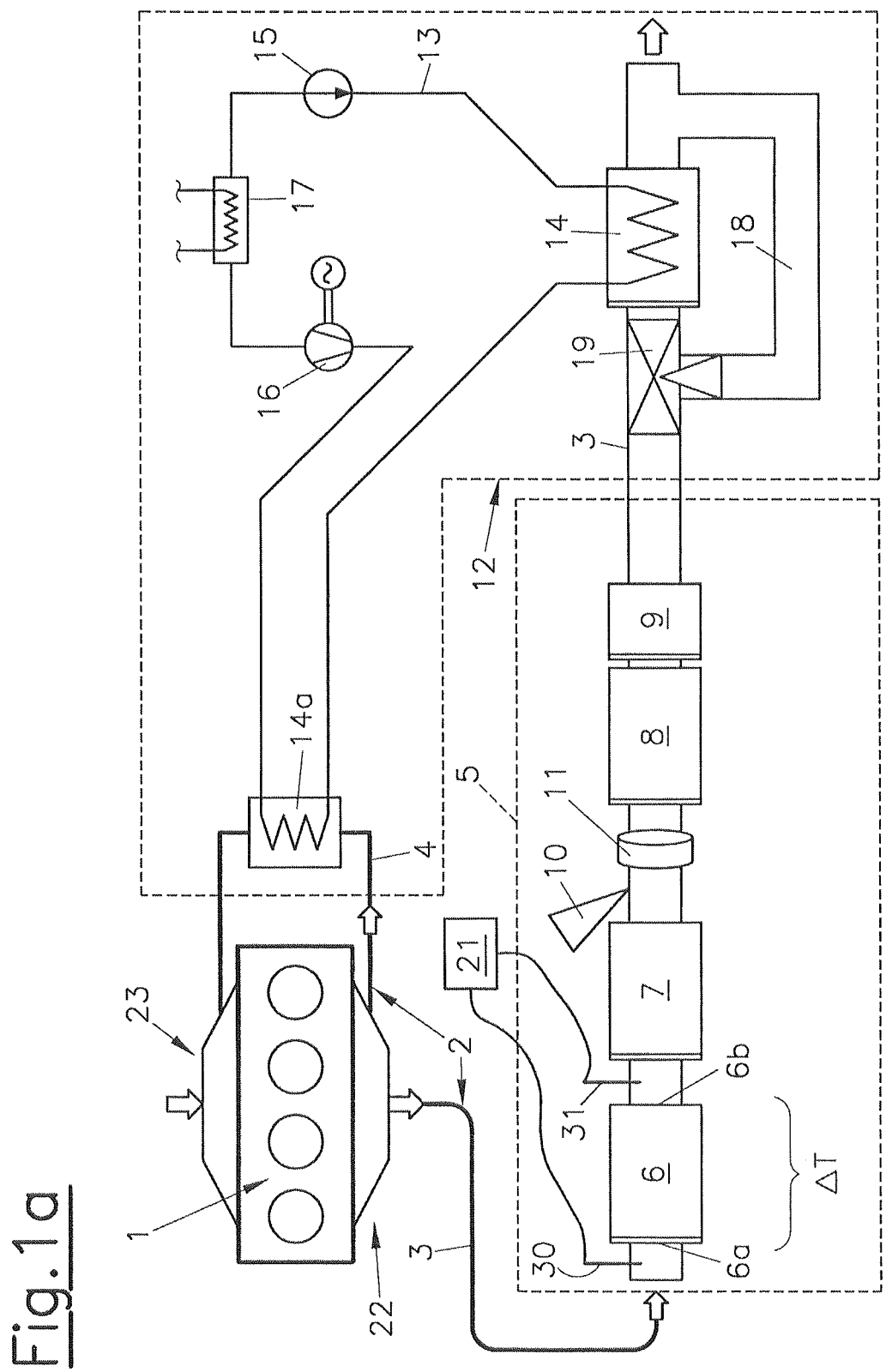
FIG. 1a schematically shows an internal combustion engine according to the invention in a first embodiment.
Figure 1B:
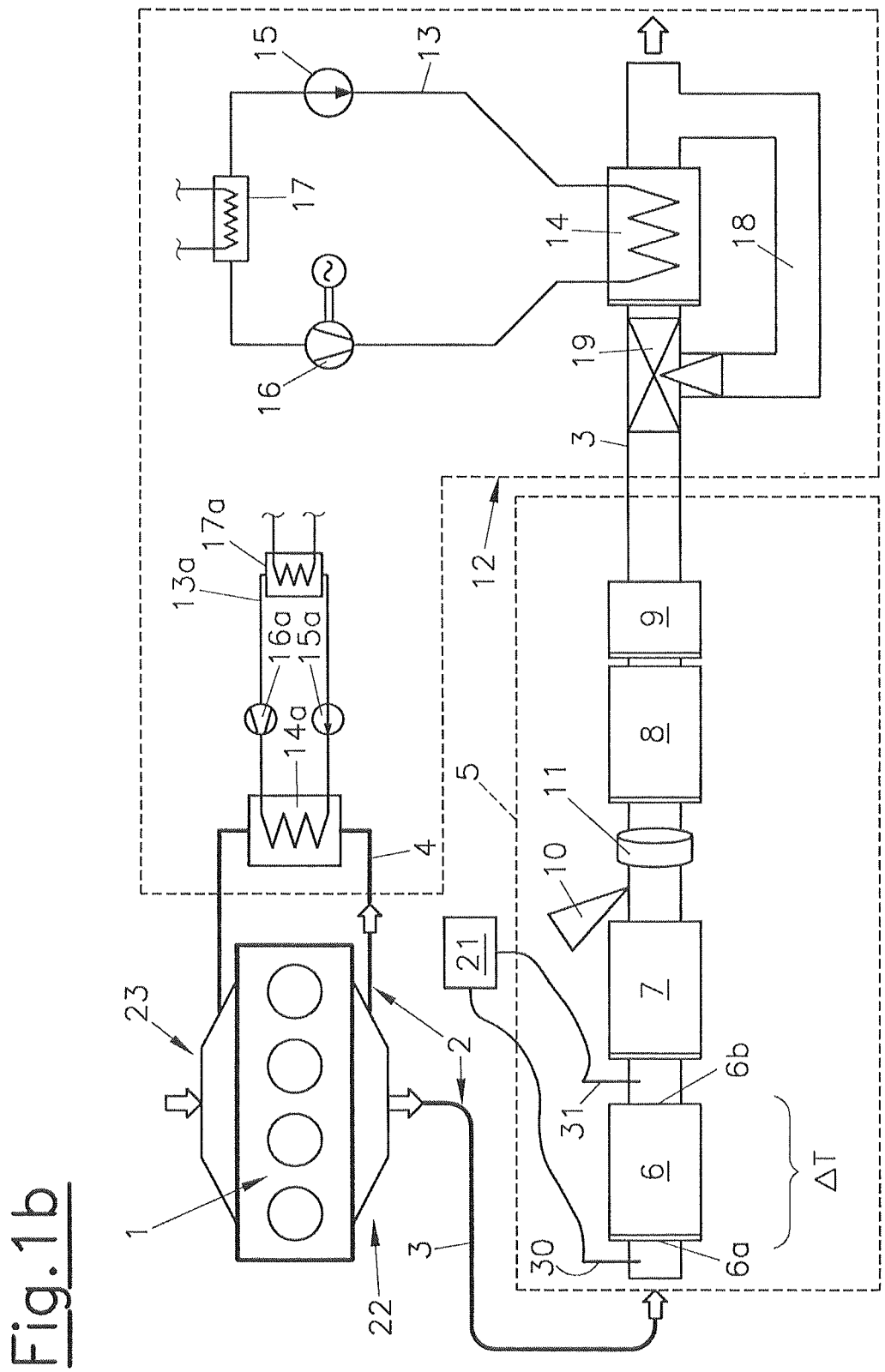
FIG. 1b schematically shows an internal combustion engine according to the invention in a second embodiment.
Figure 2:
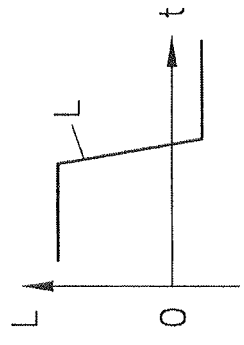
FIGS. 2 and 3 show a temporal progression of the load and the determined temperature difference for a leakage-free heat recovery system.

FIGS. 1 and 2 each show an internal combustion engine 1 with exhaust gas flow paths 2, which are formed by an exhaust gas line 3 and an exhaust gas return line 4. The exhaust gas return line 4 serves for external exhaust gas return between the exhaust system 22 and the intake system 23 of the internal combustion engine 1.

An exhaust gas after-treatment device 5 is arranged in the exhaust gas line 3, which in the exemplary embodiment has a diesel oxidation catalytic converter 6, a diesel particle filter 7, an SCR catalytic converter 8 and a barrier catalytic converter 9. An $NH_3$-containing additive can be fed via an injection device 10 upstream of the SCR catalytic converter 8. A mixer 11 serves for mixing and evaporation of the injected additive in the exhaust stream.

A heat recovery system 12 with a closed working medium circuit 13 for a working medium, e.g. ethanol, is provided for recovering the exhaust heat, which has at least one evaporator 14, a pump 15, and at least one expansion machine 16 arranged in the gas exhaust line 3. Reference numeral 17 denotes a condenser. For the bypass of the evaporator 14 on the exhaust side, a bypass line 18 is provided which branches off from the exhaust gas line 3 upstream of the evaporator 14 and opens into the exhaust gas line 3 again downstream of the first evaporator 14. Reference numeral 19 denotes a control element, which is formed, for example, by a changeover flap, for switching the exhaust gas flow between the flow path through the evaporator 14 and the bypass line 18.

Further, an EGR evaporator 14a (EGR=Exhaust Gas Recirculation) is provided in the exhaust gas recirculation line 4, which may be incorporated into the working medium circuit 13 of the heat recovery system 12 upstream or downstream of the evaporator 14. In the first embodiment variant shown in FIG. 1a, the second evaporator 14a is integrated into the working medium circuit 13 downstream of the first evaporator 14. Alternatively, however, the second evaporator 14a can also be arranged in a second working medium circuit 13a of the heat recovery system 12, which has a second pump 15a, a second expansion machine 16a and a second condenser 17a, as shown in FIG. 1b.

A first temperature sensor 30 is arranged upstream of the oxidation catalytic converter 6 and a second temperature sensor 31 is arranged downstream of the oxidation catalytic converter 6. The temperature sensors 30, 31 are connected to a control and/or evaluation unit 21.

With the first 30 and second temperature sensors 31, the exhaust gas temperatures $T_{30}$ or $T_{31}$ are measured in the exhaust gas line 3 upstream or downstream of the oxidation catalytic converter and a temperature difference $\Delta T$ is determined on the oxidation catalytic converter 6 between its input 6a and the output 6b.

In the oxidation catalytic converter 6, mainly unburnt hydrocarbons ($C_mH_n$) and carbon monoxide (CO) are converted to carbon dioxide and water. During this process, energy is released of the order of the lower calorific values of carbon monoxide and hydrocarbons. The lower calorific value of CO is approximately 10.1 MJ/kg, the lower calorific value of $C_mH_n$ is, for example, 42 MJ/kg (equivalent to diesel/lubricating oil). During the conversion of the $C_mH_n$ and the CO in the oxidation catalytic converter 6, the released energy is used to heat the oxidation catalytic converter 6 and to heat the exhaust gas stream passing through the oxidation catalytic converter 6.

The increase in the exhaust gas temperature during the through-flow of the oxidation catalytic converter 6 is dependent on the concentration of the hydrocarbons and the carbon monoxide at the inlet of the oxidation catalytic converter 6.

If leakage occurs in the region of the EGR evaporator 14a, this results in an increased temperature difference $\Delta T$ between the temperature $T_{31}$ at the output 6b and the temperature $T_{30}$ at the input 6a of the oxidation catalytic converter 6.

When an abnormally high temperature difference $\Delta T$ between the measured values of the second temperature sensor 31 and the first temperature sensor 30 occurs during the normal engine operation of the internal combustion engine 1, this temperature difference $\Delta T$ is subjected to a plausibility check by reducing or stopping the injection quantity of fuel through the fuel injection devices (not shown in closer detail) into the internal combustion engine 1 by using a closed control circuit for example, and it is examined whether a substantial reduction in the measured temperature difference occurs after a defined first waiting time (for example 30 to 60 seconds) has elapsed. Furthermore, if an abnormally high temperature difference $\Delta T$ is still detected, a conclusion can be drawn on a leakage in the EGR evaporator 14a.

Alternatively or additionally, the injection of the fuel can be reduced or stopped for carrying out a plausibility check in the motor-braking mode of the internal combustion engine 1, and it can be examined whether a substantial reduction in the measured temperature difference $\Delta T$ occurs after a defined second waiting time has elapsed, and if an abnormally high temperature difference $\Delta T$ is still determined upstream and downstream of the oxidation catalytic converter 6, a conclusion can be drawn on a leakage in the EGR evaporator 14a.

The method according to the invention can be carried out during a stationary operating mode, a transient operating mode or a load-free operating mode of the internal combustion engine 1.

In order to carry out a leakage test in stationary operation, a maximum stationary setpoint value for the temperature difference $\Delta T$ upstream and downstream of the oxidation catalytic converter 6 is defined for at least one defined stationary operating mode of the internal combustion engine 1. The internal combustion engine 1 is operated in this stationary operating mode and the determined temperature difference $\Delta T$ is compared with the defined stationary setpoint value of the defined stationary operating mode. If the determined temperature difference $\Delta T$ is greater than the maximum stationary setpoint value of the defined stationary operating mode, a conclusion can be drawn on a leakage in the EGR evaporator 14a.

In order to carry out the leakage test in transient operation, a maximum transient setpoint value for the temperature difference $\Delta T$ upstream and downstream of the oxidation catalytic converter 6 is defined for at least a defined transient operating mode of the internal combustion engine 1. The internal combustion engine 1 is operated in this transient operating mode and the determined temperature difference $\Delta T$ is compared with the defined transient setpoint value of the defined transient operating mode. A conclusion is drawn on a leakage in the evaporator if the determined temperature difference $\Delta T$ is greater than the maximum transient setpoint value of the defined transient operating mode.

The leakage test can also be carried out during at least one load-free operating mode of the internal combustion engine 1, e.g. idling running, coasting operation or motor-braking operation. A minimum value for the temporal reduction of the temperature difference $\Delta T$ upstream and downstream of the oxidation catalytic converter 6 is defined for at least a defined load-free operating mode of the internal combustion engine 1. The internal combustion engine 1 is operated in this load-free operating mode and a temporal progression of the temperature difference $\Delta T$ upstream and downstream of the oxidation catalytic converter 6 is determined and compared with the defined minimum value for the temporal reduction in the temperature difference ΔT. If the reduction in the determined temporal progression of the temperature difference ΔT is less than the minimum value for the temporal reduction of the temperature difference ΔT upstream and downstream of the oxidation catalytic converter 6 in the load-free operating mode, a conclusion can be drawn on a leakage in the EGR evaporator 14a.

Figure 3:
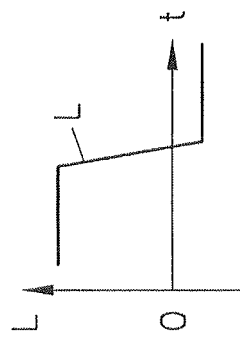

FIGS. 2 and 3 show a temporal progression of the load L and the temperature difference ΔT for a leakage-free heat recovery system 12 during a changeover of the internal combustion engine 1 to the motor-braking mode. Usually, the injection of the fuel is substantially reduced or stopped during the motor-braking operation. It can clearly be seen that the determined temperature difference ΔT drastically decreases, thus there is no leakage.

Figure 4:
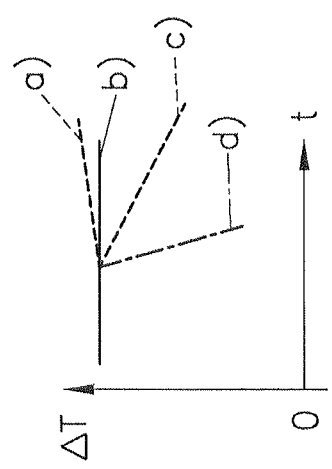
FIGS. 4 and 5 show a temporal progression of the load and the determined temperature difference for a leakage-containing heat recovery system when using the present invention.
Figure 5:
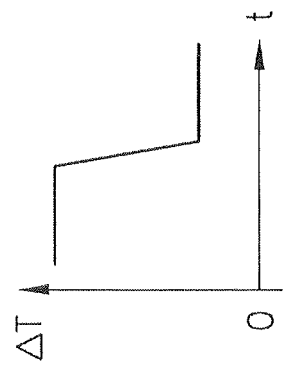

FIGS. 4 and 5, on the other hand, show a changeover to motor-braking operation when there is a leakage in the EGR evaporator 14a. In this case, there is no reduction in the temperature difference ΔT. On the contrary, due to the unchanged leakage and the lower gas throughput of the exhaust gas return line in the motor-braking operation, an increase in the temperature difference ΔT can even occur, as shown by the dashed line curve a). The line b) shows the case that no change occurs in the temperature difference ΔT. Furthermore, it can happen that the reduction in the temperature difference ΔT is substantially lower than expected, i.e. the minimum value indicated by line d) for the temporal reduction of the temperature difference ΔT is not reached. In these cases a), b), c), a leakage of the EGR evaporator 14a can be clearly concluded and a corresponding leakage warning can be output to the driver.

The main advantage of the present invention is that no additional complex leakage detectors have to be installed. In the ideal case, first 30 and second temperature sensors 31 arranged as a standard in the exhaust gas line 3 can be used in order to enable reliable leakage tests to be carried out.

The invention claimed is:

1. A method for detecting a leaking point in a heat recovery system of an Internal combustion engine of a motor vehicle, wherein the heat recovery system comprises at least one combustible working medium and a working medium circuit with at least one exhaust gas recirculation (EGR) evaporator, a pump and at least one expansion machine, wherein the recirculated exhaust gas of the Internal combustion engine flows through or around the EGR evaporator which Is arranged in an exhaust-gas return line, and wherein at least one oxidation catalytic converter is arranged in an exhaust gas line of the Internal combustion engine, wherein a first temperature sensor is arranged in the exhaust gas line upstream of the oxidation catalytic converter and a second exhaust gas temperature sensor is arranged downstream of the oxidation catalytic converter, and temperatures of the exhaust gas are measured with the first and second temperature sensors during operation of the Internal combustion engine in the exhaust gas line upstream and downstream of the oxidation catalytic converter, and a temperature difference of the exhaust gas upstream and downstream of the oxidation catalyst is determined, wherein upon occurrence of at least an abnormally high temperature difference a conclusion is drawn on a leak in the EGR evaporator.

2. The method according to claim 1, wherein for at least one defined stationary operating mode of the Internal combustion engine, a maximum stationary setpoint value Is defined for the temperature difference upstream and downstream of the oxidation catalytic converter, wherein the internal combustion engine is operated in said stationary operating mode and the determined temperature difference is compared with the defined stationary setpoint value of the defined stationary operating mode, and wherein a conclusion is drawn on a leakage at the EGR evaporator when the determined temperature difference is greater than the maximum stationary temperature stationary setpoint value of the defined stationary operating mode.

3. The method according to claim 1, wherein a maximum transient setpoint value for the temperature difference upstream and downstream of the oxidation catalytic converter is defined for at least one defined transient operating mode of the internal combustion engine, wherein the Internal combustion engine is operated in the transient operating mode and the determined temperature difference is compared with the defined transient setpoint value of the defined transient operating mode, and wherein a conclusion is drawn on a leakage in the EGR evaporator when the determined temperature difference is greater than the maximum transient setpoint value of the defined transient operating mode.

4. The method according to claim 1, wherein a minimum value for a temporal reduction in the temperature difference upstream or downstream of the oxidation catalytic converter is defined for at least one defined, load-free operating mode of the internal combustion engine during idle running, coasting operation or motor-braking operation of the Internal combustion engine, wherein the Internal combustion engine is operated in this load-free operating mode and a temporal curve of the temperature difference upstream and downstream of the oxidation catalytic converter is determined and compared with the defined minimum value for the temporal reduction in the temperature difference, and wherein a conclusion is drawn on a leakage in the EGR evaporator when the reduction in the determined temporal curve of the temperature difference is lower than the minimum value for the temporal reduction in the temperature difference upstream and downstream of the oxidation catalyst in the load-free operating mode.

5. The method according to claim 1, wherein in normal engine operation of the Internal combustion engine
upon the occurrence of an abnormally high temperature difference a plausibility check is carried out in that the injection quantity of fuel and it is examined whether a reduction in the measured temperature difference occurs after the expiration of a defined waiting time, and
if an abnormally high temperature difference still detected upstream and downstream of the oxidation catalyst, a conclusion Is drawn on a leakage in the EGR evaporator.

6. The method according to claim 1, wherein injection of the fuel Is reduced or stopped in the motor-braking mode of the Internal combustion engine, and it Is examined whether a substantial reduction in the measured temperature difference occurs after expiration of a defined time period, and if an abnormally high temperature difference is still detected upstream and downstream of the oxidation catalyst, a conclusion Is drawn on a leakage in the EGR evaporator.

7. The method according to claim 1, wherein an abnormally high temperature difference is determined when the difference of the measured temperature is greater than 10°±20° downstream and upstream of the oxidation catalyst.

8. The method according to claim 7, wherein the waiting time is at least 30 to 60 seconds.

9. The method according to claim 1, wherein a corresponding warning signal is output when a leakage in the EGR evaporator is detected.

10. The method according to claim 1, wherein the conclusion Is drawn on the leak in the EGR evaporator after carrying out a plausibility check.

11. The method according to claim 4, wherein the load-free operating mode of the Internal combustion engine is selected from the group of Idle running operation, coasting operation or motor-braking operation of the Internal combustion engine.

12. The method according to claim 5, wherein the injection quantity of fuel is reduced or stopped by means of a closed control loop.

13. The method according to claim 6, wherein the time period Is at least 30 to 60 seconds.

14. An Internal combustion engine, comprising a heat recovery system which has at least one particularly combustible working medium and a working medium circuit with at least one exhaust gas recirculation (EGR) evaporator, a pump and at least one expansion machine, wherein the EGR evaporator is arranged in an exhaust gas recirculation line of the Internal combustion engine, and wherein at least one oxidation catalytic converter is arranged in at least one exhaust gas line of the Internal combustion engine, wherein a first temperature sensor is arranged upstream of the oxidation catalytic converter and a second temperature sensor is arranged downstream of the oxidation catalytic converter, and with said first and second temperature sensors, the temperature of the exhaust gas in the exhaust gas line of the internal combustion engine can be measured upstream and downstream of the oxidation catalytic converter, wherein said first and second temperature sensors are connected to at least one of an electronic control and evaluation unit.

* * * * *

UNITED STATES PATENT AND TRADEMARK OFFICE
CERTIFICATE OF CORRECTION

Page 1 of 1

PATENT NO. : 10,024,159 B2
APPLICATION NO. : 15/652997
DATED : July 17, 2018
INVENTOR(S) : Glensvig et al.

It is certified that error appears in the above-identified patent and that said Letters Patent is hereby corrected as shown below:

On the Title Page

Item (71) Applicants should read:
AVL LIST GMBH, Graz (AT)
FPT INDUSTRIAL S.P.A., Torino (IT)
IVECO S.P.A., Torino (IT)

Item (73) Assignee should read:
AVL LIST GMBH, Graz (AT)
FPT INDUSTRIAL S.P.A., Torino (IT)
IVECO S.P.A., Torino (IT)

Item (30) Foreign Application Priority Data should read:
July 18, 2016 (AT)......................... A50641/2016

Signed and Sealed this
Eighteenth Day of September, 2018

Andrei Iancu
*Director of the United States Patent and Trademark Office*